United States Patent [19]

Okumura et al.

[11] 4,308,832
[45] Jan. 5, 1982

[54] HELICALLY SHAPED INTAKE PORT OF AN INTERNAL COMBUSTION ENGINE

[75] Inventors: Takeshi Okumura, Susono; Hiroshi Ikeda, Mishima, both of Japan

[73] Assignee: Toyota Jidosha Kogyo Kabushiki Kaisha, Toyota, Japan

[21] Appl. No.: 72,159

[22] Filed: Sep. 5, 1979

[30] Foreign Application Priority Data

Jun. 20, 1979 [JP] Japan .................................. 54-76698

[51] Int. Cl.³ ............................................. F02B 31/00
[52] U.S. Cl. ................................ 123/306; 123/188 M
[58] Field of Search ................ 123/188 M, 306, 52 M

[56] References Cited

U.S. PATENT DOCUMENTS

| 3,008,458 | 11/1961 | Eisele et al. | 123/306 |
| 3,273,551 | 9/1966 | Julien et al. | 123/188 M |
| 3,335,707 | 8/1967 | Heinrich | 123/306 |
| 3,933,142 | 1/1976 | List et al. | 123/188 M |
| 3,945,363 | 3/1976 | Elsbett et al. | 123/188 M |

FOREIGN PATENT DOCUMENTS

| 1956351 | 11/1969 | Fed. Rep. of Germany | 123/188 M |
| 2122942 | 12/1971 | Fed. Rep. of Germany | 123/188 M |

Primary Examiner—Ira S. Lazarus
Assistant Examiner—Andrew M. Dolinar
Attorney, Agent, or Firm—Kenyon & Kenyon

[57] ABSTRACT

A helically-shaped intake port comprising a helical portion and an inlet passage portion which is tangentially connected to the helical portion and extends so as to be slightly curved. The intake valve is arranged at the outlet open end of the helical portion. The side wall of the inlet passage portion, which is located near the axis of the intake valve, has on its upper portion an inclined wall portion which is arranged to be directed downwards. A projection projecting downwards and arranged to enclose the valve stem of the intake valve is formed in one piece on the upper wall of the helical portion. The projection has a maximum thickness at a position near the cross point of the circumferential wall of the projection and the straight line passing through the axis of the intake valve, and extending in parallel with a plane containing the inlet open end of the inlet passage portion. The upper half of the inclined wall portion of the side wall of the inlet passage portion is tangentially connected to the circumferential wall of the projection, which has the maximum thickness.

10 Claims, 9 Drawing Figures

HELICALLY SHAPED INTAKE PORT OF AN INTERNAL COMBUSTION ENGINE

DESCRIPTION OF THE INVENTION

The present invention relates to a helically-shaped intake port of an internal combustion engine.

Particularly in a compression-ignition type internal combustion engine, in order to create a strong swirl motion in the combustion chamber of an engine at the time of the intake stroke, a helically-shaped intake port comprising a substantially straight inlet passage portion and a helical portion is used. However, even if such a helically-shaped intake port is applied to a spark-ignition type gasoline engine and, in addition, a slight change of the construction of the helically-shaped intake port is effected so as to create a swirl motion of the strength necessary to obtain a good combustion when an engine is operating under a light load, since the engine speed normally used in a gasoline engine is considerably greater than that normally used in a compression-ignition type engine, the flow resistance which the mixture flowing in the helically-shaped intake port is subjected to becomes large in a gasoline engine. As a result of this, a problem occurs in which the volumetric efficiency is reduced when a gasoline engine is operating at a high speed under a heavy load.

As a helically-shaped intake port capable of creating a strong swirl motion when an engine is operating at a low speed while ensuring a high volumetric efficiency when the engine is operating at a high speed under a heavy load, a helically-shaped intake port having a novel construction is disclosed in the co-pending U.S. patent application Ser. No. 38,819, filed on May, 14, 1979 and assigned to the same applicant as that of the present application. This helically-shaped intake port comprises a helical portion and an inlet passage portion defind by an upper wall, a bottom wall, a first side wall arranged at a position near the axis of the intake valve and a second side wall arranged at a position remote from the axis of the intake valve, a portion of the first side wall being inclined so as to be directed downwards. In addition, in this helically-shaped intake port, a downwardly extending cylindrical projection having an approximately uniform thickness in all radial directions thereof and used for supporting the stem guide of the intake valve is formed on the upper inner wall of the helical portion of the helically-shaped intake port, and the upper half of the above-mentioned inclined portion of the first side wall is smoothly connected to the circumferential wall of the cylindrical projection. Consequently, the mixture flowing into the inlet passage portion swirls along the circumferential wall of the cylindrical projection within the helical portion and, as a result, a swirl motion is created within the helical portion of the helically-shaped intake port. In order to create a strong swirl motion by using such a helically-shaped intake port, it is necessary to cause the mixture flowing along the upper wall of the helical portion to flow as close to the circumferential wall of the helical portion as possible. However, in the above-mentioned helically-shaped intake port disclosed in the U.S. patent application Ser. No. 38,819, since a part of the mixture flowing into the helical portion from the inlet passage portion swirls along the circumferential wall of the cylindrical projection, the radius of the swirl motion of said part of the mixture is small. Nevertheless, since the momentum of such a swirl motion, the radius of which is small, is small the swirl motion of the mixture is attenuated immediately after the mixture flows into the combustion chamber and, as a result, it is difficult to create a satisfactory strong swirl motion in the combustion chamber.

An object of the present invention is to provide a helically-shaped intake port having a novel construction which is capable of creating a strong swirl motion in the combustion chamber when an engine is operating at a low speed, while ensuring a high volumetric efficiency when an engine is operating at a high speed under a heavy load.

According to the present invention, there is provided a helically-shaped intake port of an internal combustion engine, which comprises: a helical portion having an outlet open end and an intake valve arranged at said outlet open end, said helical portion being defined by an upper wall and a peripheral side wall which extends circumferentially about an axis of said intake valve, and; an inlet passage portion tangentially connected to said helical portion and having an inlet open end, said inlet passage portion being defined by an upper wall, a bottom wall, a first side wall arranged at a position near the axis of said intake valve, and a second side wall arranged at a position remote from the axis of said intake valve and connected to the peripheral side wall of said helical portion, wherein the first side wall of said inlet passage portion has an inclined wall portion which is arranged to be directed downwards, a projection which extends downwards and is arranged to enclose a valve stem of said intake valve being formed on the upper wall of said helical portion, said projection having a circumferential wall and a maximum thickness portion at a position near a cross point of said circumferential wall and a straight line which passes through the axis of said intake valve, and extends in parallel with a plane containing the inlet open end of said inlet passage portion therein, an upper half of the inclined wall portion of said first side wall being tangentially connected to the circumferential wall of said maximum thickness portion.

The present invention may be more fully understood from the description of a preferred embodiment of the invention set forth below, together with the accompanying drawings.

DESCRIPTION OF A PREFERRED EMBODIMENT

Figure 1:
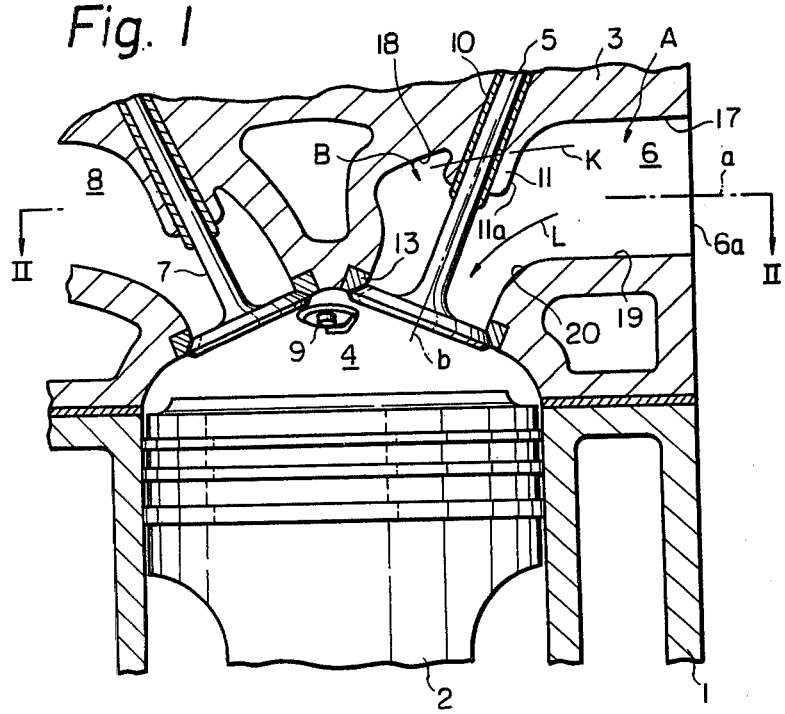
FIG. 1 is a cross-sectional side view of an internal combustion engine equipped with a helically-shaped intake port according to the present invention.
Figure 2:
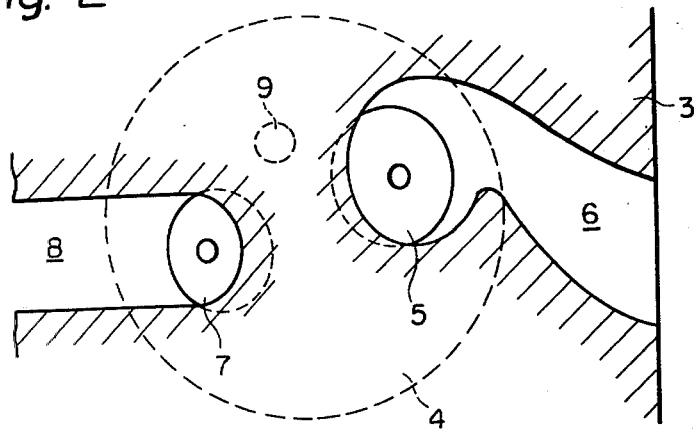
FIG. 2 is a cross-sectional plan view taken along the line II—II in FIG. 1.
Figure 4:
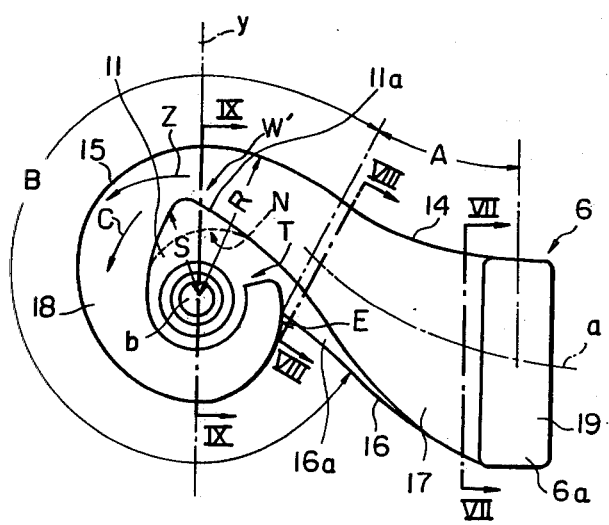
FIG. 4 is a plan view in the direction of the arrow IV in FIG. 3.
Figure 9:
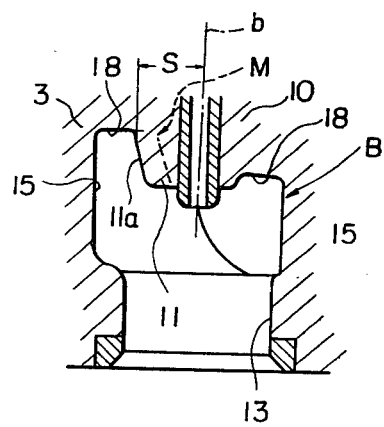
FIG. 9 is a cross-sectional view taken along the line IX—IX in FIG. 4.

Referring to FIGS. 1 and 2, 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head, 7 an exhaust valve, 8 an exhaust port and 9 a spark plug. As is illustrated in FIG. 1, a projection 11, projecting downwardly for supporting a valve guide 10, is formed in one piece on the upper inner wall of the helically-shaped intake port 6, and the tip of the valve guide 10 projects from the tip of the projection 11. As is illustrated in FIG. 9, the circumferential wall 11a of the projection 11 is slightly inclined so as to be directed downwards. In FIGS. 4 and 9, if the distance between the helix axis b and the upper edge of the circumferential wall 11a is indicated by S, and if the straight line passing through the helix axis b and extending in parallel to the plane containing the open end 6a of the inlet passage portion 6 therein is indicated by y, the distance S is gradually increased towards the helical direction C from the helix starting portion T and becomes maximum at a position near the cross point W of the straight line y and the upper edge of the peripheral wall 11a of the projection 11. Then, the distance S is rapidly reduced towards the helical direction C. The circumferential wall of the projection and the upper edge thereof, which are disclosed in the previously mentioned U.S. patent application Ser. No. 38,819, are indicated by the broken lines M and N in FIGS. 9 and 4, respectively. From FIGS. 4 and 9, it will be understood that the radial thickness of the cylindrical projection 11 according to the present invention is considerably larger, particularly at a position near the cross point W, compared to that of the cylindrical projection disclosed in the U.S. Pat. No. 38,819.

At the time of the intake stroke, the mixture formed in the carburetor (not shown) is introduced into the combustion chamber 4 via the helically-shaped intake port 6 and the intake valve 5 and, then the mixture is ignited by the spark plug 9 at the end of the compression stroke.

Figure 5:
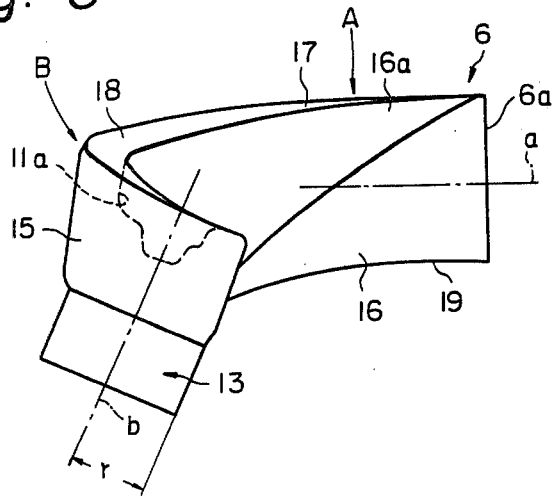
FIG. 5 is a side view in the direction of the arrow V in FIG. 3.
Figure 6:
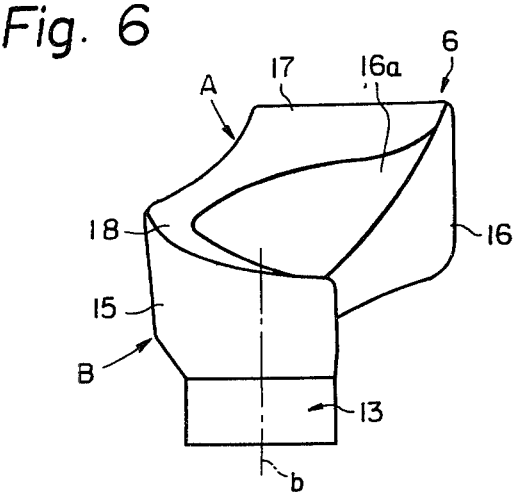
FIG. 6 is a side view in the direction of the arrow VI in FIG. 3.
Figure 7:
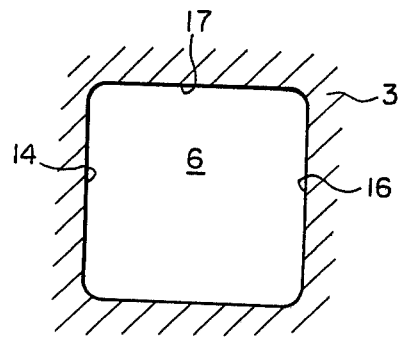
FIG. 7 is a cross-sectional view taken along the line VII—VII in FIG. 4.

FIGS. 3 through 6 schematically illustrate the shape of the helically-shaped intake port 6 illustrated in FIG. 1. As is illustrated in FIG. 4, the helically-shaped intake port 6 according to the present invention comprises an inlet passage portion A and a helical portion B, the longitudinal central axis of the inlet passage portion A being slightly curved. The inlet open end 6a of the inlet passage portion A has a rectangular cross-section (FIG. 7), and the mixture outlet portion 13 (FIG. 5) of the helical portion B has a cylindrical inner wall which extends circumferentially about the helix axis b of the helical portion B. As illustrated in FIG. 1, the helix axis b, that is, the axis of the intake valve 5, is inclined by approximately 23 degrees with respect to the axis of the cylinder, and the inlet passage portion A extends substantially horizontally. As illustrated in FIG. 4, the side wall 14 of the inlet passage portion A, which is located remote from the helix axis b, is arranged so as to be substantially vertical and is smoothly connected to the side wall 15 of the helical portion B, which extends circumferentially about the helix axis b. As illustrated in FIGS. 6 and 9, the side wall 15 of the helical portion B is so formed that it expands outwards from the cylindrical inner wall of the mixture outlet portion 13. In addition, as is illustrated in FIG. 4, the side wall 15 is so formed that the distance R between the side wall 15 and the helix axis b is maintained constant at a position near the inlet passage portion A and is gradually reduced towards the herical direction C. The distance R becomes approximately equal to the radius of the cylindrical inner wall of the mixture outlet portion 13 at the helix terminating portion E.

Figure 3:
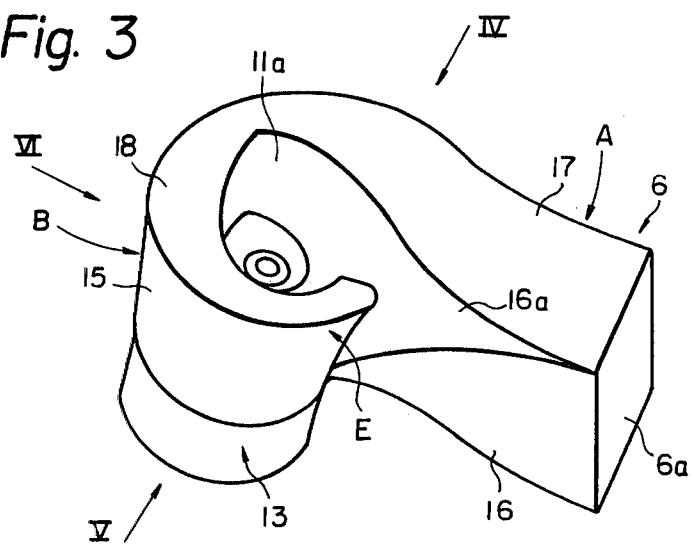
FIG. 3 is a perspective view of a helical shaped intake port schematically illustrating the helical shaped intake port illustrated in FIG. 1.
Figure 8:
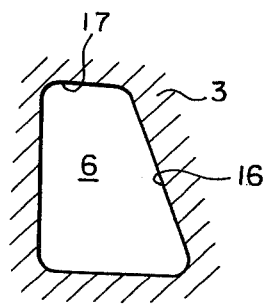
FIG. 8 is a cross-sectional view taken along the line VIII—VIII in FIG. 4.

As illustrated in FIGS. 3 and 4, the side wall 16 of the inlet passage portion A, which is located near the helix axis b, has on its upper portion an inclined wall portion 16a which is arranged to be directed downwards. The width of the inclined wall portion 16a is gradually increased towards the helical portion B and, as is illustrated in FIGS. 4 and 8, the entire portion of the side wall 16 is inclined at the connecting portion of the inlet passage portion A and the helical portion B. The upper half of the side wall 16 is smoothly connected to the circumferential wall 11a (FIG. 1) of the cylindrical projection 11, and the lower half of the side wall 16 is connected to the side wall 15 of the helical portion B at the helix terminating portion E of the helical portion B.

As is illustrated in FIGS. 1 and 5, the upper wall 17 of the inlet passage portion A extends substantially horizontally from the inlet open end 6a of the inlet passage portion A towards the helical portion B and is smoothly connected to the upper wall 18 of the helical portion B. This upper wall 18 gradually descends towards the helical direction C (FIG. 4) and is connected to the side wall 16 of the inlet passage portion A. Since the inclined wall portion 16a of the inlet passage portion A is so formed that the width thereof is gradually increased towards the helical portion B as mentioned above, the width of the upper wall 17 of the inlet passage portion A is gradually reduced. In addition, as illustrated in FIG. 4, the width of the upper wall 18 of the helical portion B is gradually reduced towards the helical direction C from the helix starting portion T until the upper wall 18 reaches the position near the cross point W. Then, after the upper wall 18 passes through the position near the cross point W, the width of the upper wall 18 is temporarily increased and, then, gradually reduced again towards the helix terminating portion E.

As is illustrated in FIGS. 1 and 5, the bottom wall 19 of the inlet passage portion A extends substantially horizontally in parallel with the upper wall 17 towards the helical portion B and is connected to the cylindrical inner wall of the mixture outlet portion 13 via a smoothly curved wall 20 as illustrated in FIG. 1. From FIG. 4, it will be understood that the width of the bottom wall 19 is gradually reduced towards the helical portion B.

In operation, a part of the mixture introduced into the inlet passage portion A moves forward along the upper walls 17 and 18, as illustrated by the arrow K in FIG. 1, and the remaining part of the mixture impinges upon the inclined wall portion 16a (FIG. 5) and is deflected downwards. As a result, the remaining part of the mixture flows into the mixture outlet portion 13 without swirling, as illustrated by the arrow L in FIG. 1. As illustrated in FIG. 4, since the widths of the upper walls 17, 18 are gradually reduced towards the cross point W, the cross-section of the flow path of the mixture flowing along the upper walls 17, 18 is gradually reduced towards the helical direction C. Therefore, the mixture flows towards the cross point W while increasing the flow velocity. After the mixture stream passes through the cross point W, the mixture stream is compulsorily pushed onto the side wall 15 of the helical portion B due to the presence of the circumferential wall 11a of the cylindrical projection 11 and, as a result, the entire mixture flowing towards the cross point W along the upper walls 17, 18 swirls towards the helical direction C along the side wall 15 of the helical portion B. Thus, a swirl motion moving downwards while swirling is created in the helical portion B and, in addition, this swirl motion causes a swirl motion of the mixture flowing into the mixture outlet portion 13, as illustrated by the arrow L in FIG. 1. Then, the mixture moves downwards while smoothing swirling along the cylindrical inner wall of the mixture outlet portion 13 and, thus, a strong swirl motion rotating about the helix axis b is created within the mixture outlet portion 13. Then, this swirling mixture flows into the combustion chamber 4 via the valve gap formed between the intake valve 5 and its valve seat and causes a strong swirl motion in the combustion chamber 4.

In the helically-shaped intake port 6 according to the present invention, since the mixture stream flowing along the upper wall 18 of the helical portion B is caused to swirl along the side wall 15 of the helical portion B, the swirl motion having a large momentum is created within the helical portion B and, as a result, a strong swirl motion can be caused in the combustion chamber 4 even when the engine is operating at a low speed. In addition, by forming the inclined wall portion 16a as mentioned previously, since a part of the mixture introduced into the inlet passage portion A flows into the mixture outlet portion 13 along the smoothly curved wall 20 without swirling, the flow resistance which the mixture flowing in the helically-shaped intake port 6 is subjected to becomes considerably small as compared with that in a conventional helically shaped intake port. As a result of this, a high volumetric efficiency can be ensured when an engine is operating at a high speed under a heavy load.

According to the present invention, it is possible to create a strong swirl motion in the combustion chamber when an engine is operating at a low speed, while ensuring a high volumetric efficiency when an engine is operating at a high speed under a heavy load.

While the invention has been described by reference to a specific embodiment chosen for purposes of illustration, it should be apparent that numerous modifications could be made thereto by those skilled in the art without departing from the spirit and scope of the invention.

What is claimed is:

1. A helically-shaped intake port of an internal combustion engine, which comprises: a helical portion having a outlet open end and an intake valve arranged at said outlet open end, said helical portion being defined by an upper wall and a peripheral side wall which extends circumferentially about an axis of said intake valve, and an inlet passage portion tangentially connected to said helical portion and having an inlet open end, said inlet passage portion being defined by an upper wall, a bottom wall, a first side wall arranged at a position near the axis of said intake valve, and a second side wall arranged at a position remote from the axis of said intake valve and connected to the peripheral side wall of said helical portion, wherein the first side wall of said inlet passage portion has an inclined wall portion which is arranged to be directed downwards, a projection which extends downwards and is arranged to enclose a valve stem of said intake valve being formed on the upper wall of said helical portion, said projection having a circumferential wall and a maximum thickness portion at a position near a cross point of said circumferential wall and a straight line which passes through the axis of said intake valve, and extends in parallel with a plane containing the inlet open end of said inlet passage portion therein, an upper half of the inclined wall portion of said first side wall being tangentially connected to the circumferential wall of said maximum thickness portion, wherein the width of the upper wall of said inlet passage portion is gradually reduced towards said maximum thickness portion, and wherein the width of the upper wall of said helical portion is temporarily increased towards a flow direction of a sucked air from said maximum thickness portion and, then, gradually reduced towards the flow direction of the sucked air.

2. A helically-shaped intake port as claimed in claim 1, wherein the width of said inclined wall portion is gradually increased towards said helical portion.

3. A helically-shaped intake port as claimed in claim 2, wherein the entire portion of said first side wall is inclined at a position wherein said inlet passage portion is tangentially connected to said helical portion.

4. A helically-shaped intake port as claimed in claim 1, wherein the thickness of said projection is gradually increased from said inlet passage portion towards said maximum thickness portion and is rapidly reduced from said maximum thickness portion towards a flow direction of a sucked air.

5. A helically-shaped intake port as claimed in claim 1, wherein the circumferential wall of said projection is slightly inclined so as to be directed downwards.

6. A helically-shaped intake port as claimed in claim 1, wherein the second side wall of said inlet passage portion is arranged so as to be substantially vertical.

7. A helically-shaped intake port as claimed in claim 1, wherein a longitudinal axis of said inlet passage portion extends to be slightly curved.

8. A helically-shaped intake port as claimed in claim 1, wherein the upper wall of said helical portion gradually descends towards the flow direction of the sucked gas.

9. A helically-shaped intake port as claimed in claim 1, wherein the bottom wall of said inlet passage portion is smoothly connected to an inner wall of said helical portion, which is located at a position near said outlet open end.

10. A helically shaped intake port as claimed in claim 9, wherein the width of the bottom wall of said inlet passage portion is gradually reduced towards said helical portion.

* * * * *